US011360292B2

(12) United States Patent
Hall et al.

(10) Patent No.: US 11,360,292 B2
(45) Date of Patent: Jun. 14, 2022

(54) COMPACT OBJECTIVE LENS WITH ENHANCED DISTORTION FOR NEAR-INFRARED IMAGING

(71) Applicant: United States of America, as represented by the Secretary of the Army, Fort Belvoir, VA (US)

(72) Inventors: John M. Hall, Stafford, VA (US); Andrew J. Dotson, Washington, DC (US); Brian D. Kellermeyer, Fort Belvoir, VA (US)

(73) Assignee: UNITED STATES OF AMERICA, AS REPRESENTED BY THE SECRETARY OF THE ARMY, Washington, DC (US)

( * ) Notice: Subject to any disclaimer, the term of this patent is extended or adjusted under 35 U.S.C. 154(b) by 395 days.

(21) Appl. No.: 16/781,341

(22) Filed: Feb. 4, 2020

(65) Prior Publication Data

US 2021/0239942 A1 Aug. 5, 2021

(51) Int. Cl.
*G02B 13/14* (2006.01)
*G02B 13/00* (2006.01)
*G02B 9/60* (2006.01)

(52) U.S. Cl.
CPC ............ *G02B 13/008* (2013.01); *G02B 9/60* (2013.01); *G02B 13/0045* (2013.01)

(58) Field of Classification Search
None
See application file for complete search history.

(56) References Cited

U.S. PATENT DOCUMENTS

| 4,682,862 | A | * | 7/1987 | Moskovich | ............ | G02B 13/18 |
| | | | | | | 359/708 |
| 8,179,615 | B1 | | 5/2012 | Tang et al. | | |
| 8,331,032 | B2 | | 12/2012 | Heimer | | |
| 8,934,179 | B2 | | 1/2015 | Ishizaka | | |
| 2017/0153419 | A1 | * | 6/2017 | Hsieh | ...................... | G02B 13/06 |
| 2020/0057280 | A1 | * | 2/2020 | Kosuge | .............. | G02B 13/0045 |

OTHER PUBLICATIONS

Yufeng Yan, Jose Sasian, "Miniature camera lens design with a freeform surface," Proc. SPIE 10590, International Optical Design Conference 2017, 1059012 (Nov. 27, 2017); doi: 10.1117/12.2292653.
Hall, John, "Tricks of the Trade", SPIE OE Magazine, Dec. 2002. Online at http://spie.org/news/tricks-of-the-trade?SSO=1.

* cited by examiner

*Primary Examiner* — Darryl J Collins
(74) *Attorney, Agent, or Firm* — Richard J. Kim

(57) ABSTRACT

The current invention describes a compact objective lens with enhanced distortion for near-infrared imaging, comprising a positively powered, aspheric, and meniscus first lens element; a negatively powered, aspheric, and meniscus second lens element; a positively powered, aspheric, and biconvex third lens element; a negatively powered, aspheric, and meniscus fourth lens element; a negatively powered, aspheric, and meniscus field corrector element; and a detector assembly comprising a window and a detector plane where the light rays come to focus.

20 Claims, 7 Drawing Sheets

| Thickness | Index $n$ @ 750 nm | Semi-Diameter | Conic | $r^4$ | $r^6$ | $r^8$ | $r^{10}$ | $r^{12}$ | $r^{14}$ | $r^{16}$ |
|---|---|---|---|---|---|---|---|---|---|---|
| Infinity | 1.0000 | 0.00 | 0.000 | 0 | 0 | 0 | 0 | 0 | 0 | 0 |
| 0.600 | 1.0000 | 3.86 | 0.000 | 0 | 0 | 0 | 0 | 0 | 0 | 0 |
| 2.475 | 1.5284 | 3.72 | 19.624 | -7.62E-04 | -5.89E-05 | 3.45E-06 | -1.81E-07 | 0 | 0 | 0 |
| 0.560 | 1.0000 | 3.78 | 0.000 | 1.37E-03 | -8.88E-05 | 2.51E-06 | -7.81E-08 | 0 | 0 | 0 |
| 1.695 | 1.6180 | 3.32 | 0.000 | -4.26E-03 | 1.92E-04 | -1.28E-05 | 2.24E-07 | 1.88E-10 | 0 | 0 |
| 0.600 | 1.0000 | 3.38 | -0.335 | -8.49E-03 | 4.08E-04 | -2.82E-05 | 8.32E-07 | -1.64E-08 | 0 | 0 |
| 3.100 | 1.5284 | 3.65 | 0.000 | 1.18E-03 | -1.44E-04 | 1.74E-05 | -9.61E-07 | 2.03E-08 | 1.91E-10 | 0 |
| 0.200 | 1.0000 | 3.78 | -3.349 | 1.19E-03 | 8.12E-05 | -5.33E-06 | 4.11E-07 | 0 | 0 | 0 |
| 2.000 | 1.5257 | 4.08 | -13.454 | -7.11E-04 | 1.41E-05 | -1.60E-05 | 1.18E-06 | -4.16E-08 | 4.23E-10 | 0 |
| 2.785 | 1.0000 | 4.22 | 0.000 | -3.53E-03 | 2.29E-04 | -1.29E-05 | 5.96E-07 | -1.11E-08 | 0 | 0 |
| 1.800 | 1.5284 | 4.43 | 0.000 | -7.39E-03 | 1.65E-04 | -1.98E-06 | 2.20E-08 | 4.62E-10 | 0 | 0 |
| 1.000 | 1.0000 | 5.87 | -2.523 | -4.90E+03 | 1.97E-04 | -5.13E-06 | 3.50E-08 | 2.26E-10 | 1.55E-11 | -4.07E-13 |
| 0.720 | 1.5118 | 6.23 | 0.000 | 0 | 0 | 0 | 0 | 0 | 0 | 0 |
| 0.288 | 1.0000 | 6.33 | 0.000 | 0 | 0 | 0 | 0 | 0 | 0 | 0 |

$z = [(cr^2) \div (1+SQRT(1-(1+k)c^2r^2))] + \alpha_1 r^4 + \alpha_2 r^6 + \alpha_3 r^8 + \alpha_4 r^{10} + \alpha_5 r^{12} + \alpha_6 r^{14} + \alpha_7 r^{16}$

FIGURE 5

| Lens# | US 8,179,615-B1 | US 8,934,179 | App. 16/574,498 | Invention |
|---|---|---|---|---|
| 1 | Bi-convex | Bi-convex | Bi-convex | Meniscus |
| 2 | Meniscus | Meniscus | Meniscus | Meniscus |
| 3 | Meniscus | Meniscus | Bi-convex | Bi-convex |
| 4 | Meniscus | Meniscus | Meniscus | Meniscus |
| 5 | Meniscus | Meniscus | Meniscus | Meniscus |
| 6 | Planar Window | Planar Window | Planar Window | Planar Window |

FIGURE 6

| Patent US8179615B1 | Current Design |
|---|---|
| $0.2 < \dfrac{CT_4}{CT_5} < 0.9$ | $\dfrac{CT_4}{CT_5} < 1.11$ |
| $0.85 < \dfrac{f}{f_1} < 1.55$ | $\dfrac{f}{f_1} < 0.84$ |
| $0.3 < \dfrac{CT_4 + T_{45}}{CT_5} < 0.7$ | $2.3 < \dfrac{CT_4 + T_{45}}{CT_5} < 2.66$ |
| $\left|\dfrac{f}{f_4}\right| + \left|\dfrac{f}{f_5}\right| < 0.6$ | $\left|\dfrac{f}{f_4}\right| + \left|\dfrac{f}{f_5}\right| < 0.81$ |

FIGURE 7

COMPACT OBJECTIVE LENS WITH ENHANCED DISTORTION FOR NEAR-INFRARED IMAGING

GOVERNMENT INTEREST

The invention described herein may be manufactured, used, sold, imported, and/or licensed by or for the Government of the United States of America.

FIELD OF THE INVENTION

This invention is applicable to the field of optics for infrared imaging, particularly in regards to an objective lens for near-infrared imaging.

BACKGROUND OF THE INVENTION

Commercial cell phone products employ extremely complex objective lens assemblies in order to provide high quality imagery within a very small volume. The cell phone camera lens assembly typically consists of three to six individual lens elements, of which most have complex non-spherical surface shapes that correct geometric aberrations over a large field of view and relatively fast F # value. Generally speaking, the faster (i.e., lower value) of the F #, the better the image quality under low light conditions. For example, U.S. Pat. No. 8,179,615 describes several embodiments of the current art of a cellphone camera lens having fields of view ranging from ±30.6° to ±40.2° and F #'s varying between 2.20 and 2.60. These embodiments are all optimized for best performance over the visible wavelength spectrum from 486.1 nm to 656.3 nm. They also provide very low optical distortion, generally no worse than ±3%. The individual elements are made from optical plastic materials which are capable of being molded in mass quantities to reduce cost. The physical length of these assemblies are on the order of about 4.8 mm and utilize an image format of roughly ±4.5 mm with 1280×720 pixels and a 0.0035 mm pitch (a typical size for a cell phone CMOS imager.) The commercial cell phone camera lenses are not ideal for night imaging however, where there is a need for imaging over the near-infrared spectrum from 650 nm to 850 nm, along with more difficult requirements for both faster F #'s, on the order of 1.35 or lower, as well as larger focal plane format pixel sizes, on the order 0.010 mm which have an increased light gathering area compared to smaller commercial pixel pitches. Simple linear scaling of the prior art forms for the larger pixel size is not sufficient to provide faster F #'s with near diffraction-limited image quality in the near-infrared spectrum. It is well known in the art of optical design that while a design optimized for a fast F # may be "stopped down" for operation at a slower F # and still maintain a given geometric image quality, the reverse of this situation is not true.

SUMMARY OF THE INVENTION

The current invention describes an objective lens assembly optical design optimized for use in near-infrared night imaging applications. The significant performance characteristics include maintaining near-diffraction limited image resolution over a wide ±32.5° field of view while operating in the near-infrared spectrum from 650 nm to 850 nm and having a fast F # of at least 1.44.

An exemplary compact objective lens with enhanced distortion for near-infrared imaging comprises a positively powered, aspheric, and meniscus first lens element; a negatively powered, aspheric, and meniscus second lens element; a positively powered, aspheric, and biconvex third lens element; a negatively powered, aspheric, and meniscus fourth lens element; a negatively powered, aspheric, and meniscus field corrector element; and a detector assembly comprising a window and a detector plane where the light rays come to focus.

BRIEF DESCRIPTION OF THE DRAWINGS

Additional advantages and features will become apparent as the subject invention becomes better understood by reference to the following detailed description when considered in conjunction with the accompanying drawings wherein:

FIG. 5 shows a lens prescription listing with exemplary parameters of radius of curvature, thickness, index of refraction, semi-diameter, conic constant, and aspheric coefficients;

FIG. 6 illustrates a table comparing critical differences between the prior art and the current invention in terms of paraxial lens shape factors; and FIG. 7 illustrates a table demonstrating additional differences between the disclosure of U.S. Pat. No. 8,179,615B1 and the current design.

DETAILED DESCRIPTION

The current invention describes an objective lens assembly optical design optimized for use in near-infrared night imaging applications. The significant performance characteristics include maintaining near-diffraction limited image resolution over a wide ±32.5° field of view while operating in the near-infrared spectrum from 650 nm to 850 nm and having a fast F # of at least 1.44. The length of the optical assembly is approximately 17.8 mm and the format size is a larger ±6.4 mm to accommodate larger 0.010 mm pixel sizes in a 1280×720 element array. An additional feature of this lens design which is different from the disclosure of U.S. patent application Ser. No. 16/574,498, is that the design utilizes optical distortion in order to improve the resolution near the center of the field of view. By deliberately implementing negative "barrel" distortion into the system, the axial focal length of the system can increase while keeping the field of view consistent for a given focal plane format dimension. This system comprises a positively powered, aspheric, and meniscus first lens element; a negatively powered, aspheric, and meniscus second lens element; a positively powered, aspheric, and biconvex third lens element; a negatively powered, aspheric, and meniscus fourth lens element; a negatively powered, aspheric, and meniscus field corrector element; and a detector assembly comprising a window and a detector plane where the light rays come to focus. The meniscus field corrector is the element that introduces a majority of the distortion in the system. It may be noted that the definitions of lens shape factors (meniscus, bi-convex, bi-concave, etc.) are determined by the paraxial lens curvatures that are best emphasized very close the optical axis, and can be quickly determined by inspection of the base radii of curvature terms ($r^2$), notwithstanding the higher order aspheric terms. The invention is best understood by referencing the ray trace drawing shown in FIG. 1.

Figure 1:
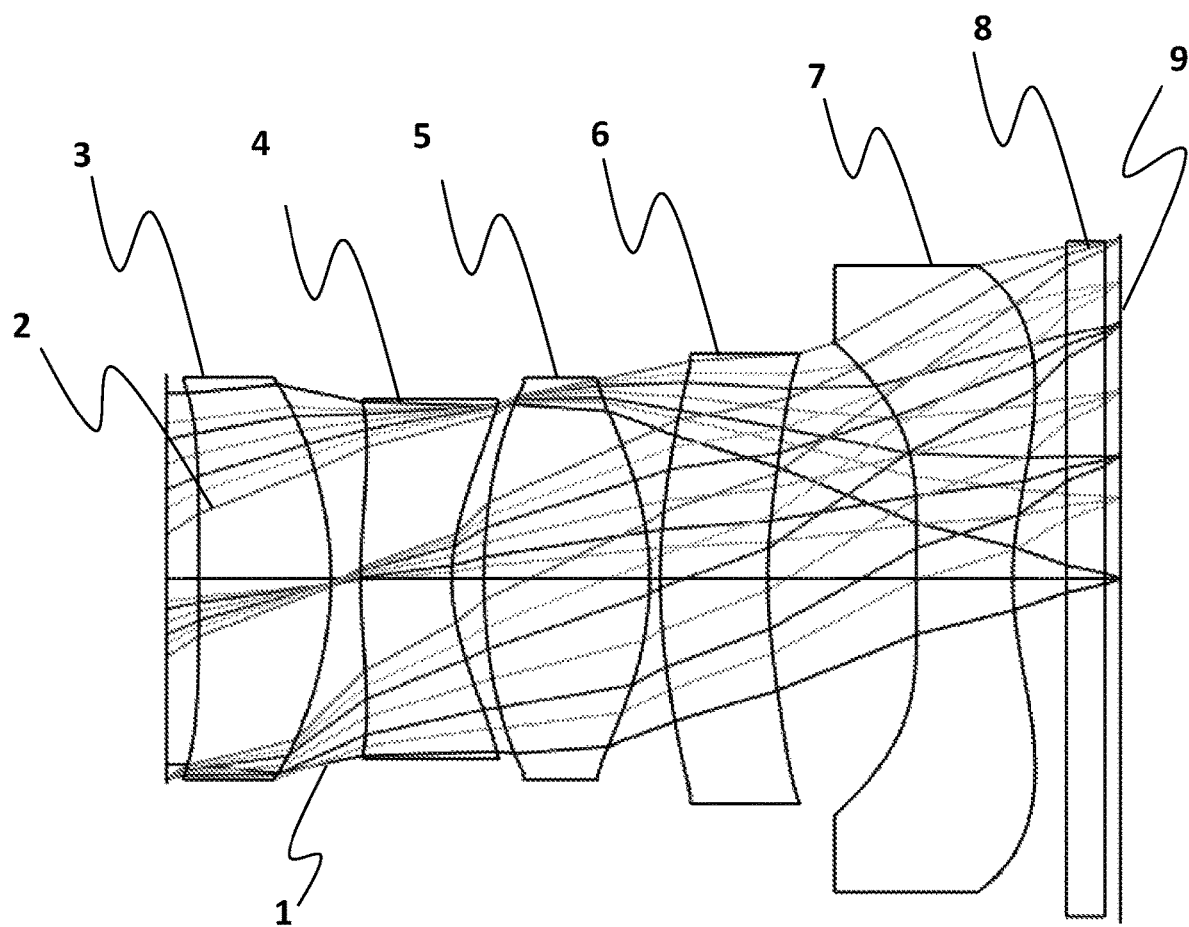
FIG. 1 shows an exemplary arrangement of compact objective lens with enhanced distortion for near-infrared imaging with ray traces.

Referencing the ray trace in FIG. 1, light ray bundles from a scene for the central field of view 1 and ray bundles for the edges of the field 2, and all fields between, enter through the first lens element 3 which is meniscus, aspheric, and has positive optical power. This lens may preferably be made of a material such as the Cyclic Olefin Copolymer (COC), with trade names such as "Topas" sold by Topas Advanced Polymers GmbH, having an index Nd=1.5337 and dispersion Vd=56.288. It has a paraxial optical power of approximately +77.7 diopters. The light rays then enter the second lens element 4 which is of a general meniscus shape, i.e. having a concave surface on one side and a convex surface on the other, along with aspherics to provide a net negative optical power. This lens is preferably made of a material such as AL-6263-(OKP4HT), which is sold commercially by AngstromLink, with an index Nd=1.6319 and dispersion Vd=23.328. It has a paraxial optical power of about –102.7 diopters. The light rays then pass through the third element 5 which is generally bi-convex with aspheres to provide positive optical power. This lens is preferably made of COC material. It has an optical power of approximately +126.5 diopters. Light then enters the negatively powered fourth optical element 6 which is meniscus in general form, and also utilizes aspheric curvatures. This lens element is preferably made from a Cyclic Olefin Polymer (COP) such as the trade name "E48R" from Zeon Corp. It has an index Nd=1.5312 and dispersion Vd=56.044. It has an optical power of –5.06 diopters. The light rays then enter the negative field corrector lens 7 which is generally of meniscus shape with strong, high order aspheric curvatures. This lens is preferably made from COC material. It has an optical power of –69.9 diopters. A flat glass window or filter element 8 is then included in the optical path as it may be part of the detector assembly which in turn also provides the detector pixel locations in the plane 9 where the image is focused. The total optical physical length is about 17.2 mm, and the total mass of the plastic elements and the glass window is on the order of 0.95 grams.

Figure 2:
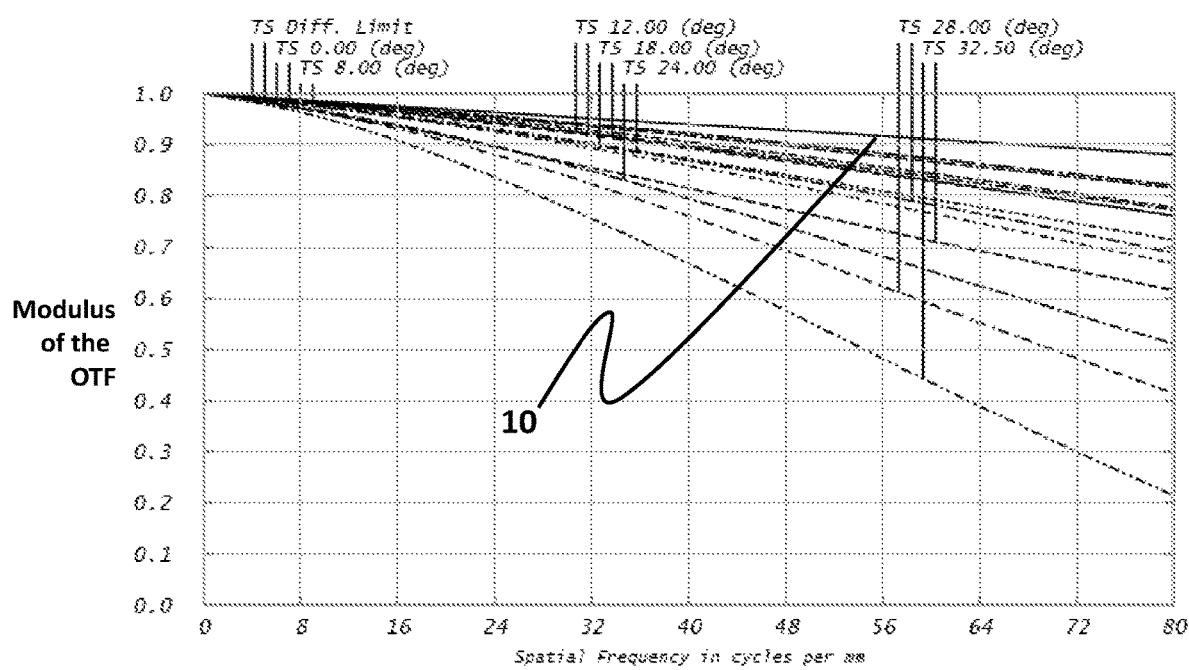
FIG. 2 shows a plot of an exemplary Modulation Transfer Function of the lens.

FIG. 2 shows a plot of the Modulation Transfer Function of the lens, which is a comprehensive measure of the resolution of the lens image. The top curve 10 shows the diffraction limit, which is the MTF of a theoretically perfect lens with no geometric aberrations. The curves below 10 are representative of the design itself, which is very close to the diffraction limit over most of the field of view as measured out to 50 cycles per millimeter in image space, the Nyquist sampling cutoff frequency of a detector with 0.010 mm pitch.

Figure 3:
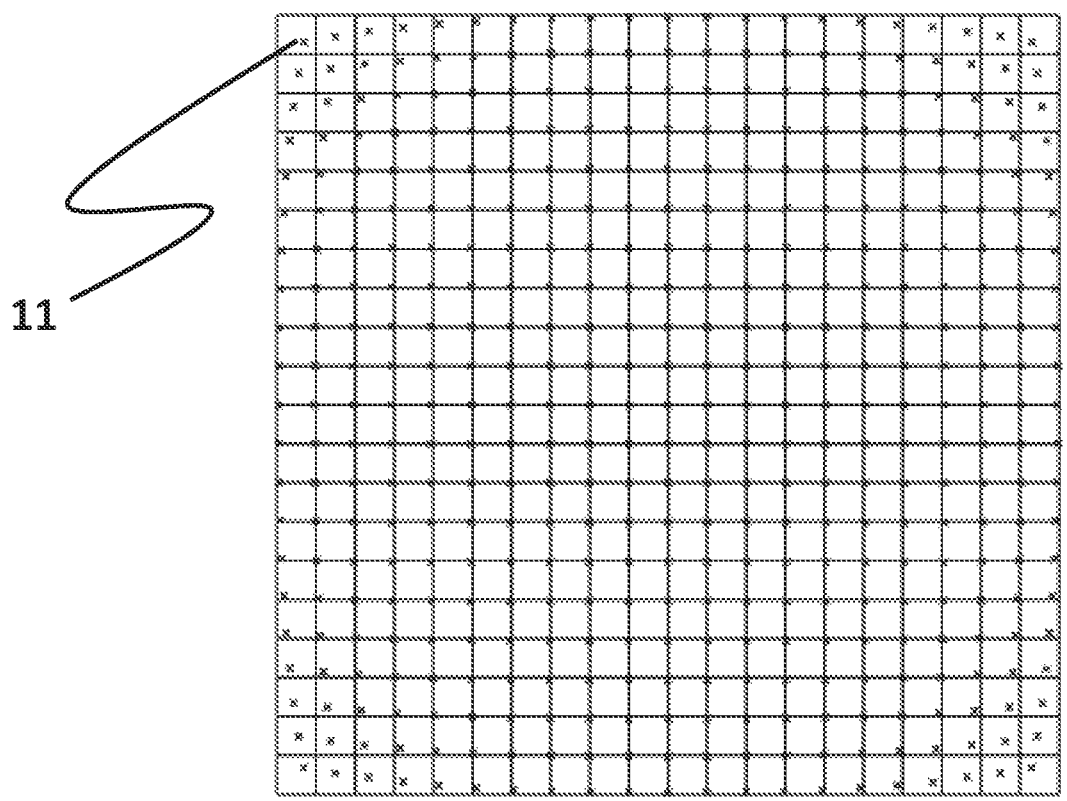
FIG. 3 shows a plot of an exemplary geometric distortion of a lens image.

FIG. 3 shows a plot of the geometric distortion of the lens image. The grid of continuous lines shows the ideal case of 0% distortion, and the array of dots mark the actual field positions as mapped through the lens. The farthest dot mark 11 in the corner corresponds to a maximum distortion of –6.92%. This distortion value enables the optical system's effective focal length (EFL) to be longer by 6.92% while still providing the same total field of view onto the focal plane detector format. In the preferred embodiment, the EFL is 10.8 mm. The longer focal length then provides a narrower instantaneous field of view (IFOV) for the pixels in the center, which in turn provides more pixels on a target of a given size. Normally this level of optical distortion would be objectionable if presented directly to the human eye, therefore the preferred implementation of this technique is to use this lens within an image projecting system which can provide either an electronic digital image correction in a video output signal going to a display, or a compensating distortion in a magnifying eyepiece which views a display, such that the human eye would perceive a net distortion of 0.00%.

Figure 4:
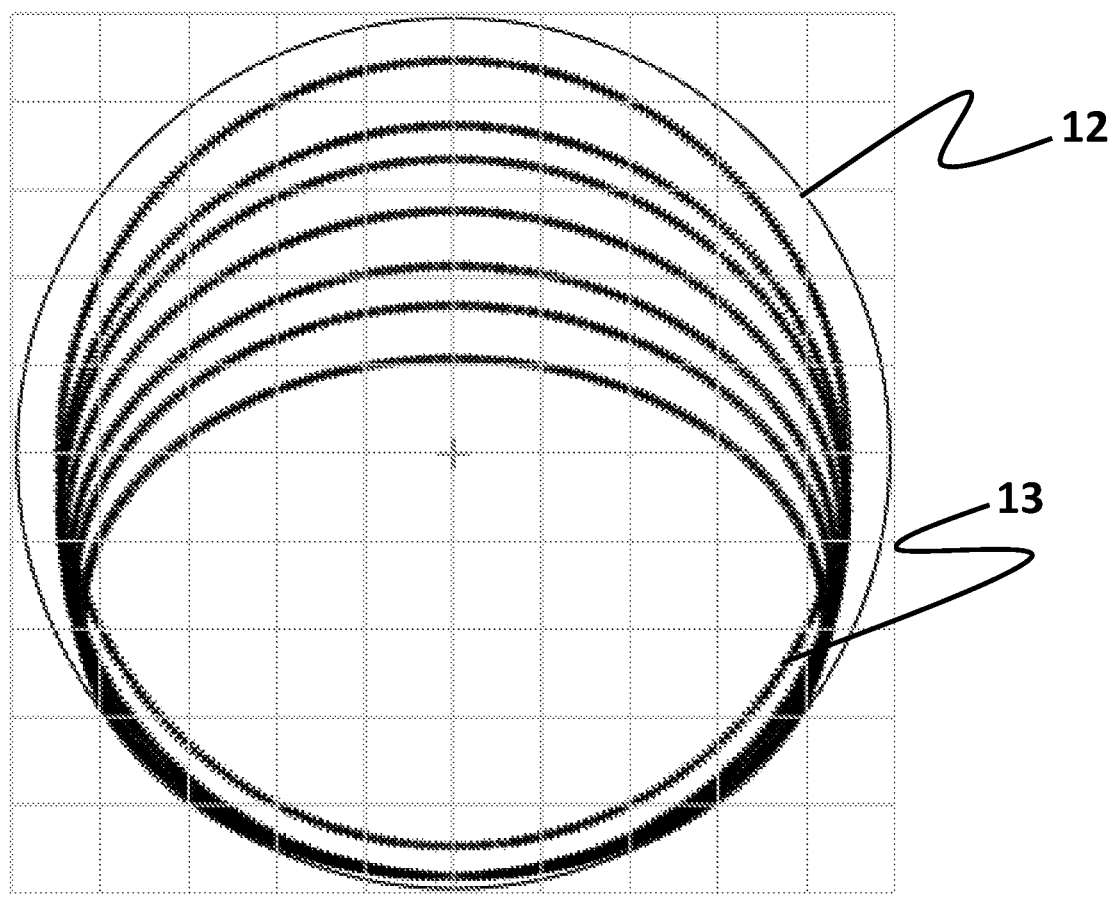
FIG. 4 shows a plot of exemplary beam footprints for several field positions as seen in the plane of an air gap sitting 0.7 mm in front of the first lens.

FIG. 4 shows a plot of the beam footprints for several field positions as seen in the plane of an air gap sitting 0.7 mm in front of the first lens 3. The largest footprint 12 corresponds to the on-axis field ray bundle, indicating that this field is operating at the paraxial F # of 1.45. Subsequent fields show gradually increasing vignetting, finally resulting in the footprint 13 which corresponds to the farthest edge of the field of view. This farthest field position has about 61.2% of the light relative to the on-axis ray bundle. The use of vignetting to obtain a very fast axial F # is explained in the reference, OE Magazine 2002, "Tricks of the Trade", and is a significant difference from the prior art exhibited by U.S. Pat. No. 8,179,615.

FIG. 5 shows the lens prescription listing with the parameters of radius of curvature, thickness, index of refraction, semi-diameter, conic constant, and aspheric coefficients. The sag of the lens curvatures is defined by the following equation where "z"=sag, "c"=spherical radius of curvature, "k"=conic constant, "r" is the position along the semi-diameter, and the coefficients "$\alpha_x$" correspond to the even-ordered aspheric polynomial terms:

$$z = [(cr^2) \div (1 + \text{SQRT}(1 - (1+k)c^2 r^2))] + \alpha_1 r^4 + \alpha_2 r^6 + \alpha_3 r^8 + \alpha_4 r^{10} + \alpha_5 r^{12} + \alpha_6 r^{14} + \alpha_7 r^{16}$$

Materials with an index=1.000 are air gaps, and all values within the table assume a nominal temperature of 20° C. and a pressure of 1 atmosphere.

Novelty as Compared to the Prior Art. The table in FIG. 6 illustrates the critical differences between the prior art and the current invention in terms of paraxial lens shape factors.

The principle novelty may thus be summarized by the following characteristics:

Near-infrared spectral band.
Fast F # of at least 1.44.
Use of vignetting for the edges of field of view.
Shape factor arrangement of the five powered lens elements (see table).
Deliberate use of negative "barrel" optical distortion to achieve a longer focal length and hence better resolution of a target object, while maintaining the same field of view for a given focal plane format size.

The next table in FIG. 7 demonstrates additional differences between the disclosure of U.S. Pat. No. 8,179,615B1 and the current design, wherein the variables illustrated in FIG. 7 are defined as follows:

| Variable | Definition |
| --- | --- |
| $CT_4$ | Thickness of the fourth optical element in the system. |
| $CT_5$ | Thickness of the fifth optical element in the system. |
| f | Effective focal length of the entire system. |
| $f_1$ | Focal length of the first optical element in the system. |
| $T_{45}$ | Distance along the optical axis between the 4th and 5th elements in the system. |

The differences in shape factor from application Ser. No. 16/574,498 and the distinct contrast between the disclosures of U.S. Pat. No. 8,179,615-B1 and U.S. Pat. No. 8,934,179 versus the current invention demonstrate that the claimed invention is not taught by prior art.

It is obvious that many modifications and variations of the present invention are possible in light of the above teachings. It is therefore to be understood that within the scope of the appended claims, the invention may be practiced otherwise than as described.

What is claimed is:

1. A compact objective lens assembly with enhanced distortion for near-infrared imaging, comprising:
    an aspheric and meniscus first lens element first disposed along an optical path to provide a positive optical power;
    a meniscus second lens element disposed next along the optical path to provide a negative optical power;
    a biconvex third lens element with aspheres disposed next along the optical path to provide a positive optical power;
    a meniscus fourth lens element having aspheric curvatures disposed next along the optical path to provide a negative optical power;
    a negative field corrector lens which is of meniscus shape with strong, high order aspheric curvatures disposed next along the optical path; and
    a windowed detector assembly disposed next along the optical path to focus light rays entering the windowed detector assembly to a detector plane, wherein an image is focused onto the detector plane for near-infrared imaging.

2. The compact objective lens assembly according to claim 1, wherein the compact objective lens assembly has a length of approximately 17.8 mm; and its format size is a larger ±6.4 mm to accommodate larger 0.010 mm pixel sizes in a 1280×720 element array.

3. The compact objective lens assembly according to claim 1, wherein the aspheric and meniscus first lens element is based on a Cyclic Olefin Copolymer lens material.

4. The compact objective lens assembly according to claim 1, wherein the aspheric and meniscus first lens element is characterized by an index Nd=1.5337; dispersion Vd=56.288; and a paraxial optical power of approximately +77.7 diopters.

5. The compact objective lens assembly according to claim 1, wherein the meniscus second lens element has a concave surface on one side and a convex surface on another side, along with aspherics to provide a net negative optical power.

6. The compact objective lens assembly according to claim 1, wherein the meniscus second lens element is characterized by an index Nd=1.6319; dispersion Vd=23.328; and a paraxial optical power of about −102.7 diopters.

7. The compact objective lens assembly according to claim 1, wherein the biconvex third lens element with aspheres is based on a Cyclic Olefin Copolymer lens material.

8. The compact objective lens assembly according to claim 1, wherein the biconvex third lens element with aspheres has an optical power of approximately +126.5 diopters.

9. The compact objective lens assembly according to claim 1, wherein the meniscus fourth lens element having aspheric curvatures is based on a Cyclic Olefin Polymer lens material.

10. The compact objective lens assembly according to claim 1, wherein the meniscus fourth lens element having aspheric curvatures is characterized by an index Nd=1.5312; dispersion Vd=56.044; and an optical power of −5.06 diopters.

11. The compact objective lens assembly according to claim 1, wherein the negative field corrector lens is based on a Cyclic Olefin Copolymer lens material.

12. The compact objective lens assembly according to claim 1, wherein the negative field corrector lens has an optical power of −69.9 diopters.

13. The compact objective lens assembly according to claim 1, wherein the windowed detector assembly has an optical window through which an image is focused along the optical path onto the detector plane having detector pixel locations for near-infrared imaging.

14. The compact objective lens assembly according to claim 13, wherein said optical window is either a flat glass window or a filter element.

15. The compact objective lens assembly according to claim 1, wherein a total optical physical length is about 17.2 mm, and a total mass is about 0.95 grams.

16. A method of near-infrared imaging using the compact objective lens assembly with enhanced distortion according to claim 1, the steps of the method of near-infrared imaging comprising:
    light ray bundles from a scene enter through the aspheric and meniscus first lens element to provide a positive optical power to its output of first light rays;
    the first light rays then enter the meniscus second lens element to provide a negative optical power to its output of second light rays;
    the second light rays then pass through the biconvex third lens element with aspheres to provide positive optical power to its output of third light rays;
    the third light rays then enter the meniscus fourth lens element having aspheric curvatures to provide a negative optical power to its output of fourth light rays;
    the fourth light rays then enter the negative field corrector lens which is of meniscus shape with strong, high order aspheric curvatures to produce field corrected light rays; and
    said field corrected light rays pass through an optical window disposed along the optical path to be focused on detector pixel locations as a focused image.

17. The method of near-infrared imaging according to claim 16, wherein said light ray bundles from a scene are comprised of light ray bundles from a scene for the central field of view, light ray bundles for edges of the field, and light ray bundles from all fields between.

18. The method of near-infrared imaging according to claim 16, wherein said meniscus second lens element has a concave surface on one side and a convex surface on the other, along with aspherics to provide a net negative optical power to its second light rays.

19. The method of near-infrared imaging according to claim 16, wherein said optical window disposed along the optical path is a flat glass window or filter element disposed in said optical path as a part of its detector assembly having said detector pixel locations in a plane to which said image is focused.

20. The method of near-infrared imaging according to claim 16, wherein its near-diffraction limited image resolution is achieved over a wide ±32.5° field of view while operating in a near-infrared spectrum from 650 nm to 850 nm and having a fast F # of at least 1.44.

* * * * *